(12) United States Patent
Xu et al.

(10) Patent No.: US 11,811,091 B2
(45) Date of Patent: Nov. 7, 2023

(54) ELECTRODE ASSEMBLY AND SECONDARY BATTERY

(71) Applicant: JIANGSU CONTEMPORARY AMPEREX TECHNOLOGY LIMITED, Liyang (CN)

(72) Inventors: Hu Xu, Liyang (CN); Kai Wu, Liyang (CN); Miaomiao Ren, Liyang (CN); Rui Yang, Liyang (CN); Long Xu, Liyang (CN); Youlei Lai, Liyang (CN); Yongshou Lin, Liyang (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 499 days.

(21) Appl. No.: 16/818,635

(22) Filed: Mar. 13, 2020

(65) Prior Publication Data

US 2020/0220140 A1 Jul. 9, 2020

Related U.S. Application Data

(63) Continuation of application No. PCT/CN2019/088126, filed on May 23, 2019.

(51) Int. Cl.
*H01M 50/46* (2021.01)
*H01M 10/12* (2006.01)
*H01M 50/54* (2021.01)

(52) U.S. Cl.
CPC ......... *H01M 50/46* (2021.01); *H01M 10/125* (2013.01); *H01M 50/54* (2021.01)

(58) Field of Classification Search
CPC ..... H01M 50/40–46; H01M 50/50–54; H01M 10/125
See application file for complete search history.

(56) References Cited

U.S. PATENT DOCUMENTS

2004/0009391 A1* 1/2004 Lee .......................... H01M 4/13
429/94
2010/0285342 A1* 11/2010 Lee ................... H01M 10/0587
429/94

FOREIGN PATENT DOCUMENTS

CN 1808759 A 7/2006
CN 202633449 U 12/2012
(Continued)

OTHER PUBLICATIONS

EPO English Machine Translations of CN 207677000 originally published to Zhu Lingbo on Jul. 31, 2018 (Year: 2018).*
(Continued)

*Primary Examiner* — Cynthia H Kelly
*Assistant Examiner* — Niara Trant
(74) *Attorney, Agent, or Firm* — Kilpatrick Townsend & Stockton LLP

(57) ABSTRACT

The present disclosure provides an electrode assembly and a secondary battery. The electrode assembly includes a first electrode plate, a second electrode plate and a separator. The first electrode plate, the second electrode plate and the separator are wound to a flat structure, and the flat structure comprises a main region and corner regions, the corner regions are provided at two ends of the main region along a width direction of the main region. The first electrode plate and the second electrode plate each are wound to turns. A gap is provided between two adjacent turns of the first electrode plate, the gap includes a first gap and a second gap. The first gap corresponds to the corner region in position, the second gap corresponds to the main region in position, and a dimension of the first gap is larger than a dimension of the second gap.

16 Claims, 4 Drawing Sheets

(56) References Cited

FOREIGN PATENT DOCUMENTS

| | | | |
|---|---|---|---|
| CN | 207677000 U | * | 7/2018 |
| CN | 207677000 U | | 7/2018 |
| JP | 2014191927 A | | 10/2014 |

OTHER PUBLICATIONS

Jiangsu Contemporary Amperex Technology Co., Limited, International Search Report and Written Opinion, PCT/CN2019/088126, dated Sep. 20, 2019, 12 pgs.

* cited by examiner

ELECTRODE ASSEMBLY AND SECONDARY BATTERY

CROSS REFERENCE TO RELATED APPLICATIONS

This application is a continuation application of PCT/CN2019/088126, filed on May 23, 2019, which claims priority to Chinese Patent Application No. 201811576247.2, filed with the National Intellectual Property Administration of the People's Republic of China on Dec. 22, 2018, all of which are incorporated herein by reference in their entirety.

TECHNICAL FIELD

The present disclosure relates to the field of battery, and specifically relates to an electrode assembly and a secondary battery.

BACKGROUND

Existing secondary battery generally uses a wound electrode assembly, and the electrode assembly is formed by winding a positive electrode plate, a negative electrode plate and a separator. In a charge-discharge process of the secondary battery, volume expansions of the electrode plates occur due to a lithium deintercalation state and a lithium intercalation state of an active material, and an expanding stress will be generated between the positive plate and the negative electrode plate due to the expansions, and if the expanding stress is not effectively released, the wound electrode assembly will be distorted. Particularly, in a corner region of the electrode assembly which is formed by winding, the expanding stress is most concentrated, and the distortion of the electrode assembly is more prone to occur. Further, at the later stage of the cycle, the expanding stress will extrude an electrolyte between the positive plate and the negative electrode plate, which results in infiltration capability of the electrode assembly being poor.

SUMMARY

An electrode assembly in accordance with some embodiments comprises a first electrode plate, a second electrode plate and a separator, the separator separates the first electrode plate and the second electrode plate. The first electrode plate, the second electrode plate and the separator are wound to a flat structure, and the flat structure comprises a main region and corner regions, the corner regions are provided at two ends of the main region along a width direction of the main region. The first electrode plate and the second electrode plate each are wound to turns. A gap is provided between two adjacent turns of the first electrode plate, the gap comprises a first gap and a second gap. The first gap corresponds to the corner region in position, the second gap corresponds to the main region in position, and a dimension of the first gap is larger than a dimension of the second gap.

Figure 1:
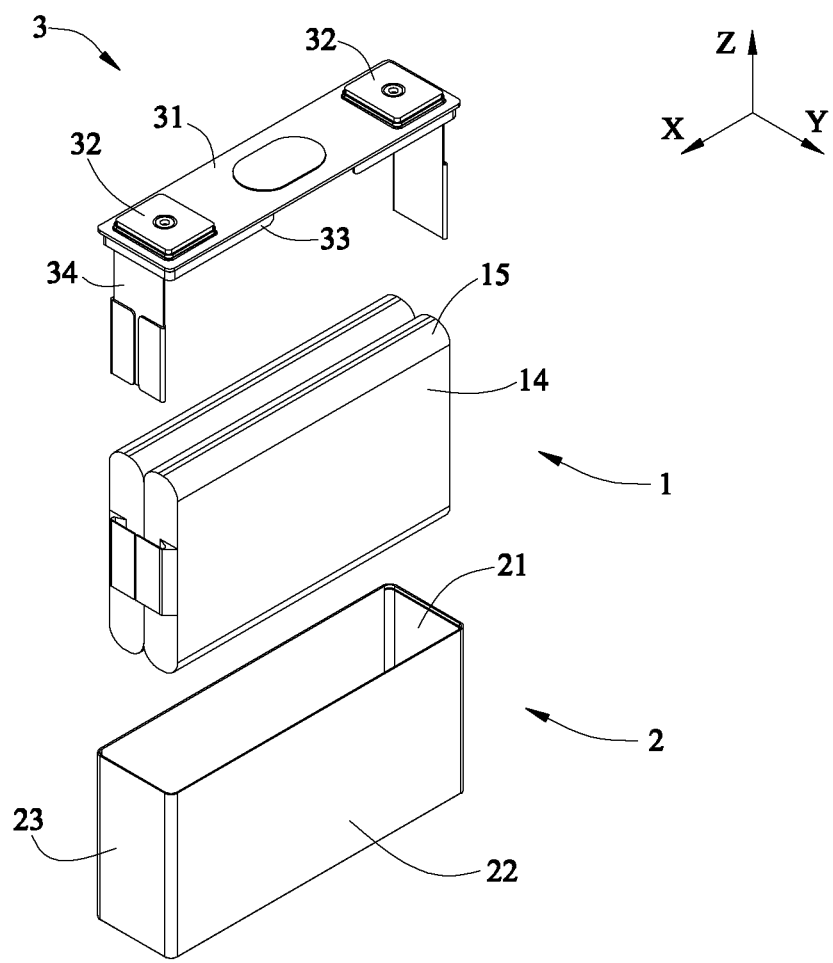
FIG. 1 is an exploded view of a secondary battery in some embodiments according to the present disclosure.

Reference numerals in figures are represented as follows:
1 electrode assembly
11 first electrode plate
12 second electrode plate
121 first region
122 second region
13 separator
131 first separator
132 second separator
14 main region
15 corner region
2 case
21 accommodating cavity
22 first side plate
23 second side plate
3 cap assembly
31 cap plate
32 electrode terminal
33 insulating member
34 current collecting member
G1 first gap
G2 second gap
G3 third gap
G4 fourth gap
P1 first protrusion
P2 second protrusion
X transverse direction
Y longitudinal direction
Z axial direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", "third", etc. are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present disclosure will be further described in detail in combination with the exemplary embodiments and the figures.

Referring to FIG. 1, a secondary battery in some embodiments of the present disclosure is a prismatic lithium-ion battery. Specifically, the secondary battery includes an electrode assembly 1, a case 2 and a cap assembly 3.

The case 2 forms an accommodating cavity 21 inside, so as to accommodate the electrode assembly 1 and an electrolyte. An opening is formed at an end of the case 2 along an axial direction Z, and the electrode assembly 1 can be placed into the case 2 via the opening. In some embodiments, the case 2 is made of a conductive metal such as aluminum or aluminum alloy. The axial direction Z is parallel to a height direction of the secondary battery, and the axial direction Z is perpendicular to a transverse direction X and a longitudinal direction Y of the secondary battery.

The case 2 in accordance with some embodiments includes first side plates 22 and second side plates 23, the first side plates 22 are respectively positioned at two sides of the electrode assembly 1 along the longitudinal direction Y, the second side plates 23 are respectively positioned at two sides of the electrode assembly 1 along the transverse direction X, the first side plates 22 and the second side plates 23 are connected together to form the accommodating cavity 21 which is rectangular. An area of the first side plate 22 is larger than an area of the second side plate 23.

Figure 2:
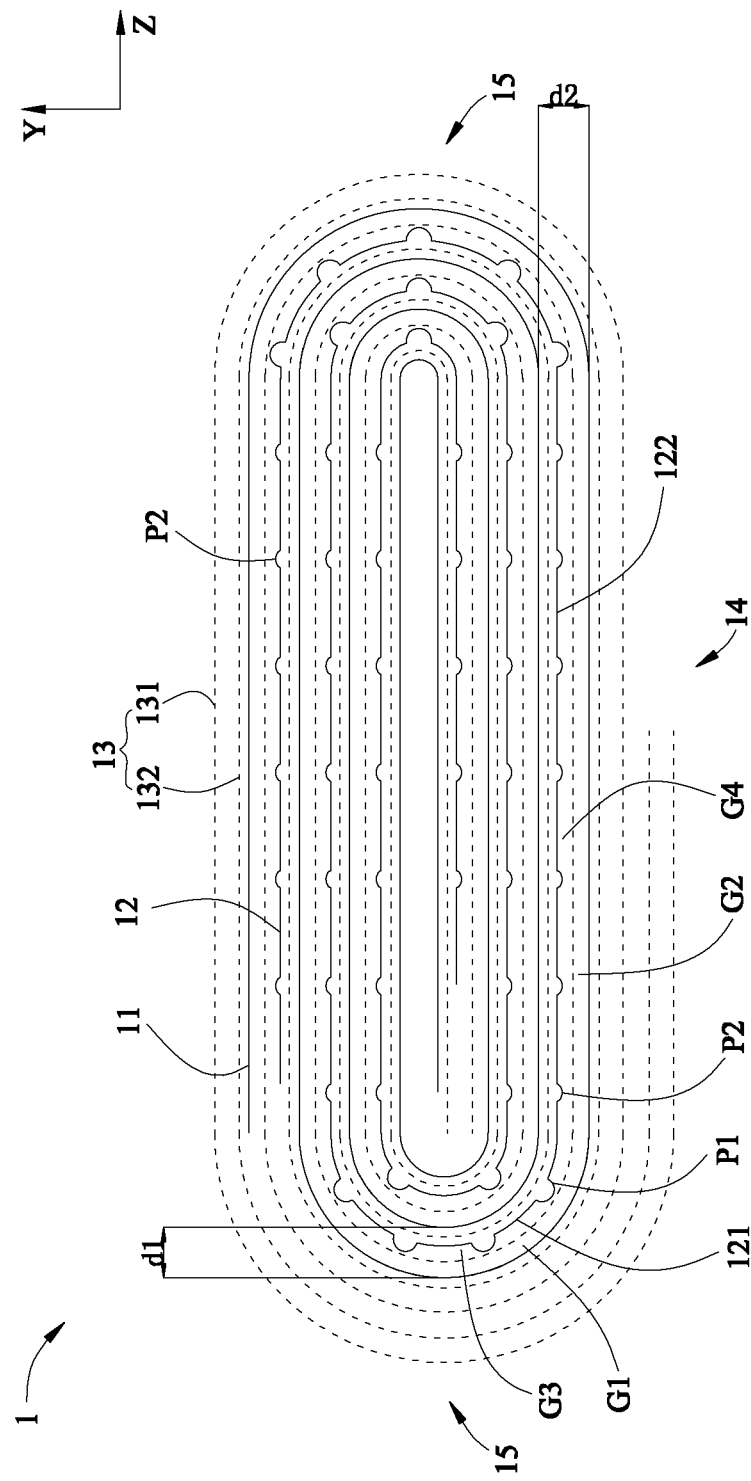
FIG. 2 is a cross-sectional view of an electrode assembly of FIG. 1.

The electrode assembly 1 in accordance with some embodiments is provided as plurality in number, and the plurality of electrode assemblies 1 are stacked sequentially along the longitudinal direction Y. Referring to FIG. 2, each electrode assembly 1 includes a first electrode plate 11, a second electrode plate 12 and a separator 13, and the separator 13 separates the first electrode plate 11 and the second electrode plate 12.

The cap assembly 3 includes a cap plate 31, an electrode terminal 32, an insulating member 33 and a current collecting member 34. The cap plate 31 is connected with the case 2 and covers the opening of the case 2, so as to seal the electrode assembly 1 in the accommodating cavity 21 of the case 2. The insulating member 33 is provided at an inner side of the cap plate 31, so as to separate the cap plate 31 and the electrode assembly 1. The electrode terminal 32 is provided to the cap plate 31 and protrudes to an outside of the cap plate 31. The electrode terminal 32 and the current collecting member 34 each are provided as two in number, one current collecting member 34 connects the first electrode plate 11 and one electrode terminal 32, the other current collecting member 34 connects the second electrode plate 12 and the other electrode terminal 32.

Referring to FIG. 2, the first electrode plate 11, the second electrode plate 12 and the separator 13 are wound to a flat structure, and the first electrode plate 11, the second electrode plate 12 and the separator 13 each are wound to turns. In the forming process, the first electrode plate 11, the second electrode plate 12 and the separator 13 are fixed to a winding mandrel, and then the first electrode plate 11, the second electrode plate 12 and the separator 13 are spirally wound to form a winding body by rotating the winding mandrel. The winding mandrel is taken out from the winding body after winding; finally, the winding body is pressed to a flat shape.

The flat structure includes a main region 14 and corner regions 15, the corner regions 15 are provided at two ends of the main region 14 in a width direction of the main region 14. In some embodiments of the present disclosure, the width direction of the main region 14 is parallel to the axial direction Z.

In the main region 14, the first electrode plate 11 and the second electrode plate 12 each are divided into a plurality of layers along a thickness direction of the main region 14, the thickness direction of the main region 14 is parallel to the longitudinal direction Y of the secondary battery. Before expanding, each layer of the first electrode plate 11 in the main region 14 is substantially perpendicular to the longitudinal direction Y, each layer of the second electrode plate 12 in the main region 14 is substantially perpendicular to the longitudinal direction Y.

In the corner region 15, the first electrode plate 11 and the second electrode plate 12 each are divided into a plurality of layers along a direction away from a winding center; each layer of the first electrode plate 11 in the corner region 15 is substantially in the shape of circular arc, each layer of the second electrode plate 12 in the corner region 15 is substantially in the shape of circular arc.

In the charge-discharge process, volume expansions of the first electrode plate 11 and the second electrode plate 12 occur, and an expanding stress will be generated between the first electrode plate 11 and the second electrode plate 12 due to the expansions, if the expanding stress is not effectively released, the electrode assembly 1 will be easy to deform. Meanwhile, the expanding stress will extrude the electrolyte between the first electrode plate 11 and the second electrode plate 12, which results in infiltration capability of the electrode assembly 1 being poor.

In some embodiments, a gap is provided between two adjacent turns of the first electrode plate 11 in the present disclosure, the gap includes a first gap G1 and a second gap G2. The first gap G1 corresponds to the corner regions 15 in position, and the second gap G2 corresponds to the main region 14 in position. A dimension of the first gap G1 is larger than a dimension of the second gap G2.

In the present disclosure, by providing the first gap G1 and the second gap G2, an expansion space can be reserved for the first electrode plate 11 and the second electrode plate 12, thereby releasing the expanding stress, reducing deformation degree of the electrode assembly 1. Meanwhile, the electrolyte can also enter into the inside of the electrode assembly 1 via the first gap G1 and the second gap G2, thereby improving the infiltration capability, and reducing a risk of lithium precipitation.

In the corner region 15, a distance between two adjacent layers of the first electrode plate 11 is defined as d1, and two layers of the separator 13 and one layer of the second electrode plate 12 are provided between the two adjacent layers of the first electrode plate 11, therefore, a value obtained by that the d1 minus a thickness of the two layers of the separator 13 and a thickness of the one layer of the second electrode plate 12 is the dimension of the first gap G1.

Similarly, in the main region 14, a distance between two adjacent layers of the first electrode plate 11 is defined as d2, and two layers of the separator 13 and one layer of the second electrode plate 12 are provided between the two adjacent layers of the first electrode plate 11, and a value obtained by that the d2 minus a thickness of the two layers of the separator 13 and a thickness of the one layer of the second electrode plate 12 is the dimension of the second gap G2.

When the electrode assembly 1 expands, the stress in the corner regions 15 is most concentrated, and the corner regions 15 is most prone to deform. Taking one turn of the first electrode plate 11 as an example, referring to FIG. 6, when expanding, the main region 14 expands most seriously in a central region (at a line L1) along the axial direction Z;

meanwhile, the first electrode plate 11 is stretched when expanding, so a certain tension is generated inside. At L1 where the expansion is most serious, the first electrode plate 11 is subjected to a combination of two tensions F1 and F4, F1 and F4 limit the expansion of the first electrode plate 11 in the main region 14; taking F1 as an example, F1 is decomposed into two component forces F11 and F12, F4 is decomposed into two component forces F41 and F42, F11 and F41 cancel each other, therefore, F12 and F42 will affect the deformation of the first electrode plate 11 in the main region 14.

Similarly, when expanding, two ends of the first electrode plate 11 in the corner region 15 are also subjected to two tensions, that is F2 and F3. A component force F21 of F2 and a component force F31 of F3 will pull the first electrode plate 11 in the corner region 15 along the axial direction Z, a component force F22 of F2 and a component force F32 of F3 will pull the first electrode plate 11 in the corner region 15 along the longitudinal direction Y; and since the first electrode plate 11 in the corner region 15 is in the shape of arc, F22 and F32 cannot cancel each other; under the action of the combination of F2 and F3, the first gap G1 will be seriously reduced. Therefore, in the electrode assembly 1, the stress in the corner region 15 is more concentrated; meanwhile, since the first electrode plate 11 and second electrode plate 12 in the corner region 15 are in the shape of arc, the first electrode plate 11 and second electrode plate 12 in the corner region 15 are easier to deform under the action of the stress. When the stress is excessively large, the first electrode plate 11 and the second electrode plate 12 in the corner region 15 are easy to fracture.

Since the stress in the corner region 15 is more concentrated, therefore, if the dimension of the first gap G1 is equal to the dimension of the second gap G2, when the electrode assembly 1 expands and deforms, a reduced extent of the first gap G1 will be greater than a reduced extent of the second gap G2. That is, if an initial dimension of the first gap G1 is equal to an initial dimension of the second gap G2, when the secondary battery is cycled to a certain extent, the dimension of the first gap G1 will be smaller than the dimension of the second gap G2. At this time, the electrolyte in the main region 14 is more than the electrolyte in the corner region 15, which results in a difference between the infiltration capability of the main region 14 and the infiltration capability of the corner region 15, and affects the consistency of the dynamic performance of the electrode assembly 1.

Therefore, in some embodiments of the present disclosure, the dimension of the first gap G1 is larger than the dimension of the second gap G2, such that a volume of the electrolyte in the first gap G1 is larger than a volume of the electrolyte in the second gap G2 before expanding. In the present disclosure, by increasing the first gap G1, the stress in the corner region 15 is released in time, which avoids the first electrode plate 11 and the second electrode plate 12 in the corner region 15 being fractured. Compared to the first gap G1, the second gap G2 has a smaller dimension, and has a smaller influence on a thickness of the secondary battery along the longitudinal direction Y. Since the stress in the corner region 15 is greater, therefore, when the secondary battery is cycled to a certain extent, the dimension of the first gap G1 will be substantially equal to the dimension of the second gap G2, so that the volume of the electrolyte in the first gap G1 is substantially equal to the volume of the electrolyte in the second gap after expanding, thereby decreasing the difference between the infiltration capability of the main region 14 and the infiltration capability of the corner region 15 to a certain extent, and ensuring the consistency of the dynamic performance of the electrode assembly 1.

In addition, when the main region 14 expands to a certain extent, the main region 14 will be attached to the first side plates 22 of the case 2, so the first side plates 22 can limit the deformation of the main region 14 even if the second gap G2 is smaller. While the corner regions 15 are in the shape of arc, the case 2 and the cap plate 31 cannot limit the distortion of the corner regions 15, so the first gap G1 needs to have a larger dimension.

A ratio of the dimension of the first gap G1 to the dimension of the second gap G2 is less than 16. If the ratio of the dimension of the first gap G1 to the dimension of the second gap G2 is too large, there will be a larger difference between a diameter of the corner region 15 and the thickness of the main region 14, which results in significant traces at junctions of the main region 14 and the corner regions 15, and affects the flatness of the electrode assembly 1.

The dimension of the first gap G1 is 20 μm-80 μm. If the dimension of the first gap G1 is less than 20 μm, the stress cannot be sufficiently released, which results in the distortion of the corner region 15. If the dimension of the first gap G1 is larger than 80 μm, the lithium-ion transmission path will be too long, and lithium precipitation is easy to occur.

The dimension of the second gap G2 is 5 μm-20 μm. The main region 14 will press the first side plate 22 when the main region 14 expands, under the action of the expanding stress of the main region 14 and a reaction force of the first side plate 22, the second gap G2 easily disappears, which leads to the electrolyte being extruded out of the main region 14, and causes cycle diving. If the dimension of the second gap G2 is larger than 20 μm, the thickness of the main region 14 will be increased to a larger extent, and the energy density of the secondary battery is lowered.

The second electrode plate 12 is provided with a first protrusion P1 and a second protrusion P2, the first protrusion P1 corresponds to the corner region 15 in position, the second protrusion P2 corresponds to the main region 14 in position. The first protrusion P1 and the second protrusion P2 protrude toward the same side of the second electrode plate 12. A height h1 of the first protrusion P1 is larger than a height h2 of the second protrusion P2.

Figure 4:
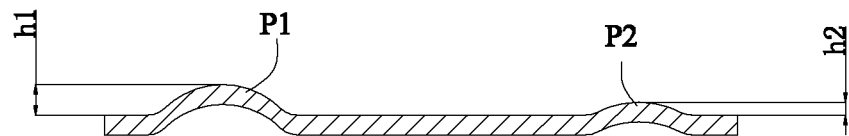
FIG. 4 is a cross-sectional view taken along a line A-A of FIG. 3.
Figure 5:
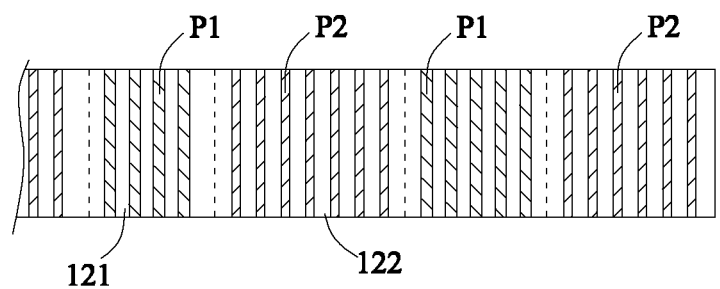
FIG. 5 is a schematic view of the second electrode plate of FIG. 2 after spread in other embodiments.

The first protrusion P1 and the second protrusion P2 can be formed by stamping the second electrode plate 12. Referring to FIG. 4, after forming, a recess is formed at an inner side of the first protrusion P1 and a recess is formed at an inner side of the second protrusion P2.

In the present disclosure, by providing the first protrusion P1 on the second electrode plate 12, the distance d1 between the two adjacent layers of the first electrode plate 11 in the corner region 15 can be increased, thereby forming the first gap G1 between the two adjacent layers of the first electrode plate 11. By adjusting the value of h1, the dimension of the first gap G1 can be adjusted.

Similarly, in the present disclosure, by providing the second protrusion P2 on the second electrode plate 12, the distance d2 between the two adjacent layers of the first electrode plate 11 in the main region 14 can be increased, thereby forming the second gap G2 between the two adjacent layers of the first electrode plate 11. By adjusting the value of h2, the dimension of the second gap G2 can be adjusted.

The first protrusion P1 can be circular, elongated, polygonal or elliptical. Referring to FIG. 4, the first protrusion P1 is circular and provided as plurality in number, and the plurality of first protrusions P1 are arranged in array; the second protrusion P2 is circular and provided as plurality in number, and the plurality of second protrusions P2 are arranged in array. Alternatively, referring to FIG. 6, the first protrusion P1 also can be elongated and provided as plurality in number, the second protrusion P2 also can be elongated and provided as plurality in number.

The separator 13 includes a first separator 131 and a second separator 132, the first separator 131 and the second separator 132 are respectively positioned at two sides of the second electrode plate 12. The first separator 131 and the second separator 132 each are wound to turns, one turn of the first separator 131 and one turn of the second separator 132 are provided between two adjacent turns of the first electrode plate 11.

The first protrusion P1 and the second protrusion P2 protrude toward the first separator 131. Referring to FIG. 2, in the corner region 15, a third gap G3 is kept between the second electrode plate 12 and the first separator 131, and a dimension of the third gap G3 is equal to the height of the first protrusion P1; in other words, the first separator 131 is attached to a top end of the first protrusion P1. In the main region 14, a fourth gap G4 is kept between the second electrode plate 12 and the first separator 131, and a dimension of the fourth gap G4 is equal to the height of the second protrusion P2; in other words, the first separator 131 is attached to a top end of the second protrusion P2. The dimension of the third gap G3 is larger than the dimension of the fourth gap G4.

Figure 3:
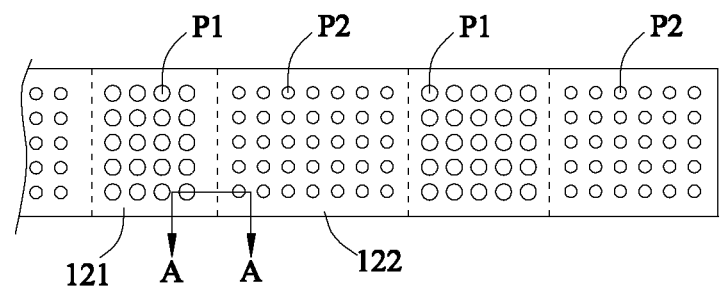
FIG. 3 is a schematic view of a second electrode plate of FIG. 2 after spread in some embodiments.

Referring to FIG. 2 and FIG. 3, the second electrode plate 12 includes a first region 121 and a second region 122. The first region 121 corresponds to the corner region 15 in position, in other words, the first region 121 is the layer of the second electrode plate 12 in the corner region 15. The second region 122 extends from an end of the first region 121 and corresponds to the main region 14 in position, that is, the second region 122 is the layer of the second electrode plate 12 in the main region 14.

The first region 121 is provided with the first protrusions P1, and a ratio of an area of the first protrusions P1 to an area of the first region 121 is 50%-90%. If the area ratio is more than 90%, a density of the first protrusions P1 will be too large, and the second electrode plate 12 is easily crushed in the forming process. If the area ratio is less than 50%, the first protrusions P1 will be weak in overall strength, and easily flattened in the winding process.

Similarly, the second region 122 is provided with the second protrusions P2, and a ratio of an area of the second protrusions P2 to an area of the second region 122 is 50%-90%. If the area ratio is more than 90%, a density of the second protrusions P2 will be too large, and the second electrode plate 12 is easily crushed in the forming process. If the area ratio is less than 50%, the second protrusion P2 will be weak in overall strength, and easily flattened in the winding process.

The first electrode plate 11 is a negative electrode plate, the first electrode plate 11 includes a copper foil and a negative active material coated on a surface of the copper foil, the negative active material includes a graphite or silicon. Correspondingly, the second electrode plate 12 is a positive electrode plate, the second electrode plate 12 includes an aluminum foil and a positive active material coated on a surface of the aluminum foil, the positive active material includes lithium manganese oxide or lithium iron phosphate. The material of the second electrode plate 12 is softer and has a good elasticity, so the second electrode plate 12 is easily pressed to form the first protrusion P1 and the second protrusion P2 and not easy to fracture.

Figure 6:
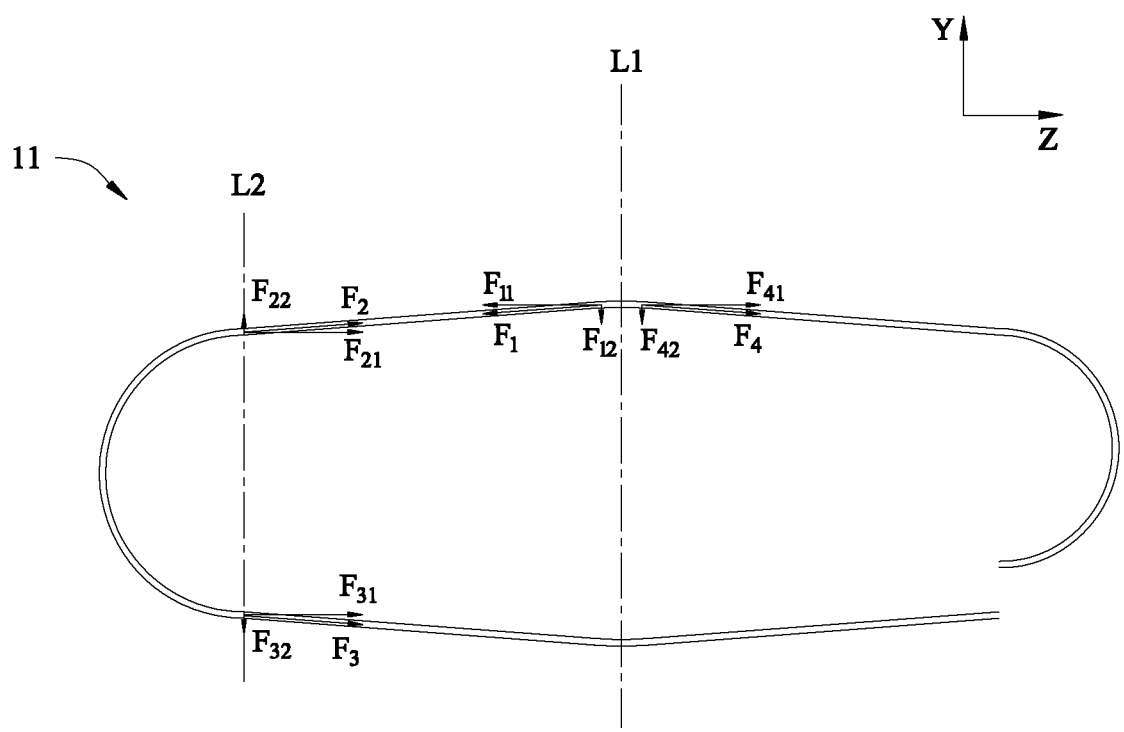
FIG. 6 is a schematic view of a first electrode plate of FIG. 2 when expanding.

A ratio of a width w of the main region 14 along the axial direction Z to a thickness t of the main region 14 along the longitudinal direction Y is 5-20. Referring to FIG. 6, the larger the width of the main region 14 is, the smaller an extended rate is when expanding, the smaller the tension in the first electrode plate 11 is, the lower the stress concentration of the corner region 15 is, and the smaller the deformation of the corner region 15 is. Certainly, if w/t is too large, such as larger than 20, the electrode assembly 1 will be too flat to satisfy requirement of the shape of the secondary battery.

In the main region 14, the number of layers of the first electrode plate 11 is even, the number of layers of the second electrode plate 12 is even. That is, the layers of the first electrode plate 11 respectively positioned at two sides of the winding center along the longitudinal direction Y are identical in number, the layers of the second electrode plate 12 respectively positioned at two sides of the winding center along the longitudinal direction Y are identical in number. In the present disclosure, the number of layers of the first electrode plate 11 in the main region 14 is configured as even, and the number of layers of the second electrode plate 12 in the main region 14 is configured as even, the symmetry of the main region 14 with respect to the winding center is promoted, the expanding stresses at two sides of the winding center in the longitudinal direction Y are equal, the uniformity of the expansion of the main region 14 is improved, the local deformation of the electrode assembly 1 is reduced, and the electrode plate is avoided being fractured.

What is claimed is:

1. An electrode assembly, comprising a first electrode plate, a second electrode plate, and a separator separating the first electrode plate and the second electrode plate, the separator comprising a first separator and a second separator respectively positioned at and adjacent to an outer side and an inner side of the second electrode plate;

wherein the electrode assembly is wound to a flat structure, the flat structure comprises a main region and a comer region, and the comer region is provided at an end of the main region along a width direction of the main region;

wherein the first electrode plate, the first and second separators, and the second electrode plate are wound to turns;

wherein a first gap and a second gap are provided between two adjacent turns of the first electrode plate, the first gap corresponds to the comer region in position, the second gap corresponds to the main region in position, and a dimension of the first gap is larger than a dimension of the second gap, wherein, the second electrode plate is provided with a plurality of first protrusions and a plurality of second protrusions, the first protrusions correspond to the comer region in position, the second protrusions correspond to the main region in position, the first protrusions and the second protrusions protrude from the outer side of the second electrode plate outwardly to the first separator adjacent to the second electrode plate, wherein a third gap and a fourth gap are provided between the second electrode plate and the first separator adjacent to the second electrode plate, the third gap corresponds to the comer region in position, the fourth gap corresponds to the main region in position, a dimension of the third gap is equal to a height of the first protrusions, and a dimension of the fourth gap is equal to the height of the second protrusions, and wherein the height of the first protrusions is larger than the height of the second protrusions, the height of the first protrusions is less than 80 µm, and the height of the second protrusions is less than 20 µm.

2. The electrode assembly according to claim 1, wherein a ratio of the dimension of the first gap to the dimension of the second gap is less than 16.

3. The electrode assembly according to claim 2, wherein the dimension of the first gap is 20 µm-80 µm, the dimension of the second gap is 5 µm-20 µm.

4. The electrode assembly according to claim 1, wherein the first electrode plate is a negative electrode plate, and the second electrode plate is a positive electrode plate.

5. The electrode assembly according to claim 1, wherein a first recess is formed at an inner side of each of the first protrusions and a second recess is formed at an inner side of each of the second protrusions.

6. The electrode assembly according to claim 1, wherein a ratio of a width of the main region to a thickness of the main region is 5-20.

7. The electrode assembly according to claim 1, wherein in the main region, the first electrode plate has an even number of layers, and the second electrode plate has an even number of layers.

8. The electrode assembly according to claim 1, wherein in the comer region, the first electrode plate and the second electrode plate each are divided into a plurality of layers;
each layer of the first electrode plate in the comer region is in the shape of circular arc, each layer of the second electrode plate in the comer region is in the shape of circular arc.

9. A secondary battery, comprising a case, a cap assembly and an electrode assembly;
wherein the case comprises an accommodating cavity, the electrode assembly is accommodated in the accommodating cavity, and the cap assembly being connected with the case;
wherein the electrode assembly comprises a first electrode plate, a second electrode plate, and a separator separating the first electrode plate and the second electrode plate, the separator comprising a first separator and a second separator respectively positioned at and adjacent to an outer side and an inner side of the second electrode plate;
wherein the electrode assembly is wound to a flat structure, the flat structure comprises a main region and a comer region, and the comer region is provided at an end of the main region along a width direction of the main region;
wherein the first electrode plate, the first and second separators, and the second electrode plate are wound to turns;
wherein a first gap and a second gap are provided between two adjacent turns of the first electrode plate, the first gap corresponds to the comer region in position, the second gap corresponds to the main region in position, and a dimension of the first gap is larger than a dimension of the second gap,
wherein, the second electrode plate is provided with a plurality of first protrusions and a plurality of second protrusions, the first protrusions correspond to the comer region in position, the second protrusions correspond to the main region in position, the first protrusions and the second protrusions protrude from the outer side of the second electrode plate outwardly to toward the first separator adjacent to the second electrode plate,
wherein a third gap and a fourth gap are provided between the second electrode plate and the first separator adjacent to the second electrode plate, the third gap corresponds to the comer region in position, the fourth gap corresponds to the main region in position, a dimension of the third gap is equal to a height of the first protrusions, and a dimension of the fourth gap is equal to the height of the second protrusions, and
wherein the height of the first protrusions is larger than the height of the second protrusions, the height of the first protrusions is less than 80 µm, and the height of the second protrusions is less than 20 µm.

10. The secondary battery according to claim 9, wherein a ratio of the dimension of the first gap to the dimension of the second gap is less than 16.

11. The secondary battery according to claim 10, wherein the dimension of the first gap is 20 µm-80 µm, the dimension of the second gap is 5 µm-20 µm.

12. The secondary battery according to claim 9, wherein the first electrode plate is a negative electrode plate, and the second electrode plate is a positive electrode plate.

13. The secondary battery according to claim 9, wherein a ratio of a width of the main region to a thickness of the main region is 5-20.

14. The secondary battery according to claim 9, wherein in the main region, the first electrode plate has an even number of layers, and the second electrode plate has an even number of layers.

15. The electrode assembly according to claim 1, wherein
the second electrode plate comprises a first region and a second region, the first region corresponds to the comer region in position, the second region extends from an end of the first region and corresponds to the main region in position;
the first region is provided with the first protrusions, and a ratio of a total area of the first protrusions to an area of the first region is 50%-90%; and
the second region is provided with the second protrusions, and a ratio of a total area of the second protrusions to an area of the second region is 50%-90%.

16. The electrode assembly according to claim 9, wherein
the second electrode plate comprises a first region and a second region, the first region corresponds to the comer region in position, the second region extends from an end of the first region and corresponds to the main region in position;
the first region is provided with the first protrusions, and a ratio of a total area of the first protrusions to an area of the first region is 50%-90%; and
the second region is provided with the second protrusions, and a ratio of a total area of the second protrusions to an area of the second region is 50%-90%.

* * * * *